J. W. PRICE.
MEANS FOR JOURNALING WHEELS TO AXLES.
APPLICATION FILED JAN. 16, 1914.
1,168,414.
Patented Jan. 18, 1916.
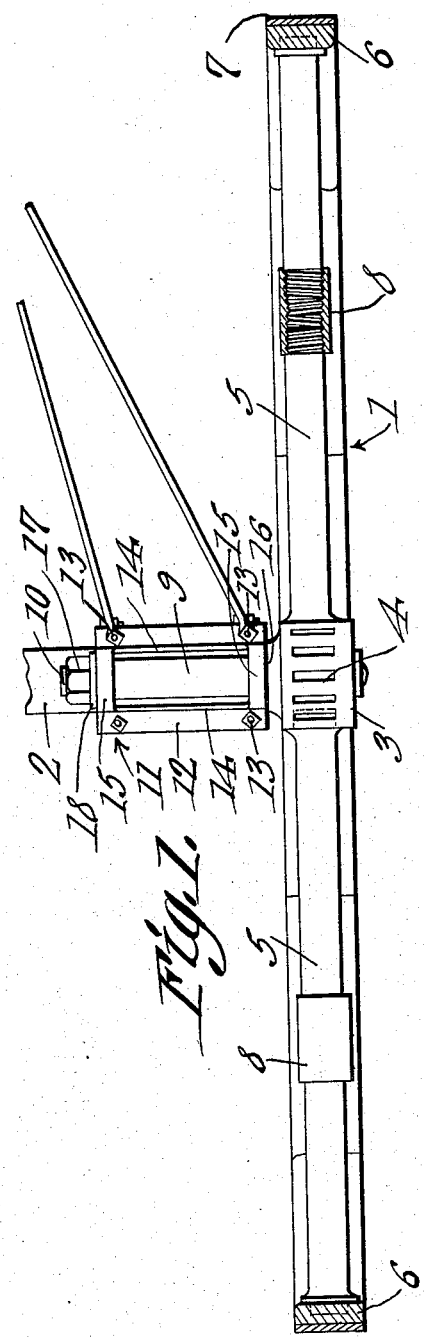
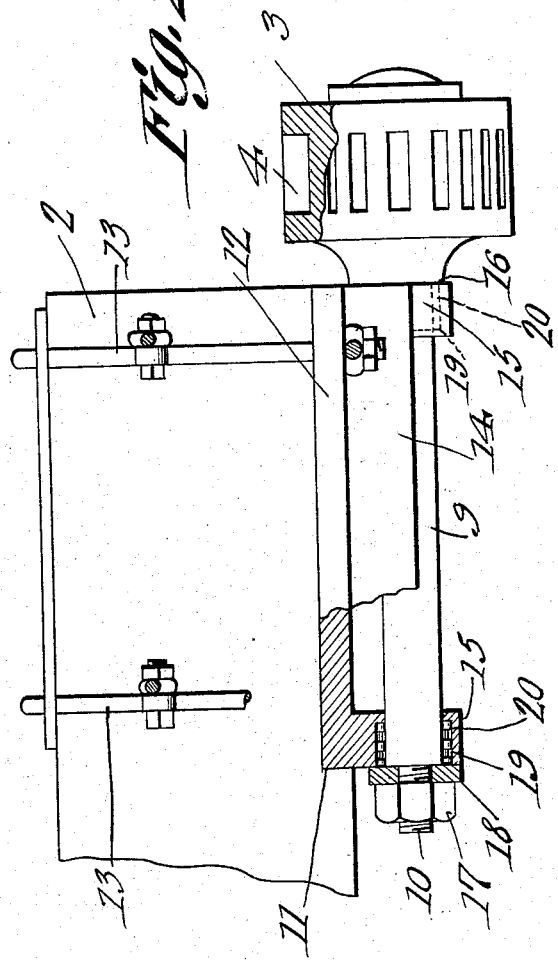
J. W. Price
Inventor
Witnesses

UNITED STATES PATENT OFFICE.

JOHN W. PRICE, OF VIVIAN, LOUISIANA.

MEANS FOR JOURNALING WHEELS TO AXLES.

1,168,414.    Specification of Letters Patent.    Patented Jan. 18, 1916.

Application filed January 16, 1914. Serial No. 812,597.

*To all whom it may concern:*

Be it known that I, JOHN W. PRICE, a citizen of the United States, residing at Vivian, in the parish of Caddo and State of Louisiana, have invented a new and useful Means for Journaling Wheels to Axles, of which the following is a specification.

The present invention appertains to running gears for wagons and other vehicles, and relates more particularly to a novel and improved means for journaling the wheels of a wagon, or other vehicle, to the axles.

It is the object of the present invention to provide unique means for mounting the wheels rotatably upon the ends of the axles or axle trees, whereby the draft of the wagon will be lightened, whereby the wagon structure will be rendered more rigid or substantial, and whereby the longevity of the service of the wagon will be attained.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiments in the accompanying drawing, wherein:—

Figure 1 is a bottom view illustrating the present invention as applied to a wheel and axle, portions being broken away. Fig. 2 is an enlarged side elevation of the parts depicted in Fig. 1, portions being broken away.

In the drawing, the numeral 1 designates the wheel, and 2, the axle or axle tree, which is preferably constructed of wood or timber of suitable proportions. The wheel 1 embodies a metallic hub 3 having peripherally arranged or radial sockets 4 receiving the inner ends of the spokes 5, the outer ends of the spokes being attached to the sections of the felly or rim 6, upon which is mounted a tire 7. The spokes 5 are each constructed of two sections, having their remote ends engaged to the hub and felly section, respectively, the adjoining ends of the spoke sections being connected by turn buckle sleeves or couplings 8, whereby the spokes may be extended or contracted to tighten or loosen the tire upon the felly, and to permit the spoke to be projected into and withdrawn from engagement with the hub.

The cardinal or salient feature of the present invention resides in the provision of an integrally inwardly or axially extending spindle 9 carried by the hub 3 of the wheel, and having a reduced threaded tip or end 10, in connection with a boxing 11 carried by the end portion of the axle 2, and having the spindle 9 journaled therethrough.

The boxing or bearing 11 embodies a base plate 12 resting against the bottom of the axle 2 at one end of the axle, and secured in place by means of U-clips 13 straddling the axle and having their ends engaged to the edge portions of the base plate 12. The base plate 12 is provided adjoining its edges with angular integral side flanges 14 and at its ends with angular integral ears 15, the flanges connecting and being integral with the side edges of the ears. The edge portions of the plate 12 project beyond the flanges 14 and beyond the sides of the axle 2, so that the clips 13 may be engaged through the said projecting edge portions of the plate. The ears 15 are provided with apertures or bores, through which the spindle 9 is journaled. The hub 3 is preferably provided with a shoulder 16 bearing against the outer ear 15 to limit the inward movement of the spindle, while a nut or retaining member 17 is threaded or engaged upon the tip 10 of the spindle, and has a washer 18 clamped thereunder and bearing against the inner ear 15 to lock the spindle in engagement with the boxing.

To reduce friction, the ears 15 are provided at their remote sides with counterbores or sockets 19 having roller bearings 20 therein parallel with and embracing the journaled portions of the spindle 9, the roller bearings being retained within the annular race ways provided by the counterbores, by the shoulder 16 of the hub and the washer 18, respectively. The shoulder 16 of the hub 3 closes one of the counter bores 19, and the washer 18 closes the other, the washer 18 being engaged upon the reduced tip or end 10 of the spindle 9, and bearing against the shoulder formed by said tip, whereby the nut 17 being tightened, will prevent the spindle from being clamped to the boxing. The spindle will therefore rotate freely.

The present invention eliminates the use of the usual iron or metallic axle having the spindles at its ends upon which the wheel hubs are journaled, and also avoids the necessity of employing body and sand bolsters, inasmuch as the wagon or vehicle body rests directly upon the axle or axle tree 2. The wheel may be readily applied to the end of the axle, the spindle 9 carried by the wheel being inserted through the ears or bearings 15, it being evident that the roller bearings of the outer ear may be readily inserted after the spindle has been partially inserted, and that the roller bearings of the inner ear 15 may be inserted after the spindle has been slid home, so that when the nut 17 and washer 18 are applied to the free end of the spindle, the spindle will be locked against longitudinal movement and the roller bearings will be held in place, as above intimated. Conversely, to detach the wheel, it is merely necessary to detach the nut 17, in order that the spindle may be withdrawn from the boxing, it being noted that the nut 17 is disposed below the axle, instead of at the outer side of the wheel, as in the ordinary wheel and axle.

It is to be observed that the boxing 11 and spindle 9 may be of any suitable length, in order that the wheel may be most effectively and substantially journaled to the axle, the boxing and spindle, as well as the retaining nut 17, being housed or disposed below and protected by the axle. The present mechanism may be applied to both the front or steering and rear axles, as will be obvious, and not only serves to lighten the draft of the wagon or vehicle, but increases the rigidity and durability thereof also.

Having thus described the invention what is claimed as new is:—

In combination, an axle, a boxing comprising a plate resting against the axle and having integral angular ears provided with counter bores at their remote sides, a wheel hub having a shoulder bearing against one ear to close the respective counter bore and having a spindle journaled through said ears, U-shaped clips straddling the axle and terminally engaged to said plate, anti-frictional rollers for said spindle in said counter bores, the spindle having a reduced end forming a shoulder, a washer upon said reduced end of the spindle and bearing against said shoulder to close the other counter bore, and a nut threaded upon said reduced end of the spindle and holding said washer thereon.

In testimony that I claim the foregoing as my own, I have hereto affixed my signature in the presence of two witnesses.

JOHN W. PRICE.

Witnesses:
TYRUS HART,
N. SEARCY.

Copies of this patent may be obtained for five cents each, by addressing the "Commissioner of Patents, Washington, D. C."